United States Patent [19]

Wirth et al.

[11] Patent Number: 4,652,004
[45] Date of Patent: Mar. 24, 1987

[54] STEER GUIDING DEVICE

[75] Inventors: Volkart Wirth; Georg Prechtel, both of Pfedelbach, Fed. Rep. of Germany

[73] Assignee: Willy Scheuerle Fahrzeugfabrik GmbH & Co., Pfedelbach, Fed. Rep. of Germany

[21] Appl. No.: 788,062

[22] Filed: Oct. 16, 1985

[30] Foreign Application Priority Data

Oct. 26, 1984 [DE] Fed. Rep. of Germany ....... 3439213

[51] Int. Cl.$^4$ .............................................. B62D 1/02
[52] U.S. Cl. .................................................. 180/168
[58] Field of Search ........................ 180/167, 168, 169; 901/1; 364/424, 447, 449

[56] References Cited

U.S. PATENT DOCUMENTS 3,744,586 7/1973 Leinauer .............................. 180/169

FOREIGN PATENT DOCUMENTS 2531057 1/1977 Fed. Rep. of Germany ...... 180/168
2443714 4/1980 France ................................ 180/168

Primary Examiner—John J. Love
Assistant Examiner—Richard Camby
Attorney, Agent, or Firm—Michael J. Striker

[57] ABSTRACT

A guide track (19) being disposed on or in the roadway is scanned by means of a scanning or sensor device (18) during the travel of a vehicle (1). The scanning or sensor device (18) is adjustable in the transverse direction of the vehicle by means of an adjustable drive (10) which is controlled by the scanning or sensor device (18) in such a manner that the transverse distance between the guide track (19) and the scanning and sensor device (18) is kept at a minimum. Thereby, the adjustment path of the scanning or sensor device (18) is a measure for the steering lock of the steering wheels (3) to be adjusted. Preferably, the adjustable drive (10) of the scanning or sensor device (18) serves as a steering drive.

6 Claims, 3 Drawing Figures

STEER GUIDING DEVICE

BACKGROUND OF THE INVENTION

The invention relates to a steer guiding device for the driverless drive operation of a steerable (not trackbound) vehicle with a scanning or sensor device mounted on the vehicle cooperating with a guide track which is disposed on the roadway or imbedded in the roadway and which influences the vehicle steering in such a manner that the distance between the scanning or sensor device and the guide track is kept at a minimum in the transverse direction of the vehicle.

Driverless vehicles with such steer guiding devices serve, for example, in factories for transporting work pieces and the like. In particular such vehicles are usable in areas which are not accessible for humans or not accessible for a long time, or only with expensive protective suits and the like because of increased temperature, ionisizing radiation and the like.

In known steer guiding devices the scanning or sensor device is fixedly mounted on the vehicle, whereby the vehicle steer guiding is controlled with an increasing steering lock in the one or the other direction, when the scanning or sensor device increasingly moves away from the guide track during the travel of the vehicle. This construction may result in that the vehicle follows the guide track in a relatively pronounced snake like path, since the steering is relatively easily overcontrolled.

SUMMARY OF THE INVENTION

It is therefore an object of the invention to provide a steer guiding system which offers the possibility, with a low expense for the steering, that the vehicle follows the guide track comparatively accurate.

This object is solved in that the scanning or sensor device is movable in the transverse direction of the vehicle by means of an adjustable drive which is controllable by the scanning or sensor device in the manner of an approximation of the same to the guide track, and that the adjustable path of the adjustable drive is a measure for the steering lock of the steering guide to be adjusted.

Due to the device in accordance with the invention the vehicle follows the track guide in a similar manner like a trailer on a pulling vehicle to which the trailer is coupled in a customary manner by means of a wagon shaft. Even if the wagon shaft is alternately adjusted by relatively large pivot movements towards both sides of the vehicle, the trailer performs only comparatively small lateral movements. In a corresponding manner the scanning or sensor device in the invention can also migrate to the one or other side of the guide track without the vehicle performing a comparatively pronounced snake movement during its travel.

In accordance with a preferred embodiment the adjustable drive of the scanning or sensor device can drive the steering of the vehicle directly, for example, in that parts of a steering linkage are immediately coupled with the adjustable drive.

Instead of a mechanical steering linkage or other mechanical transmission members fluid units, in particular, hydraulic units may be provided which serve to control the steering wheels and which are coupled with the adjustable drive.

Moreover, the adjustable drive may also drive a setting means, for example, a potentiometer which generates adjustment signals for adjustment motors being dependent from the adjustment path for controlling the steering wheels.

In a particularly advantageous embodiment of the invention it is provided that the zero position of the scanning or sensor device being associated for the straight travel of the vehicle is adjustable in the transverse direction of the vehicle, so that the center longitudinal axis of the vehicle has a more or less large, uniform side distance from the guide track during the straight travel. Thus, the possibility is generated to change the drive track of the vehicle within certain limits with respect to the guiding track, even after the installation of the guiding track.

When a remote controlled or preprogrammed controllable adjustment motor is provided for the travel path depending adjustment as well as change of the zero position, the advantageous possibility is provided to shift the driving track, which is actually travelled by the vehicle at different segments of a travelled path, differently with respect to the guide track. This is particularly important if the guide track had beens shifted in a relatively light lateral distance from obstacles and whereby previously smaller vehicles, which were able to follow the guide track without being interfered with by the obstacles, should now be replaced with larger, in particular wider vehicles. In this case, the vehicle can be guided by the obstacles by a corresponding changing of the zero position, although the guide track had been disposed in a relative large proximity with respect to the obstacles.

The invention will be described in the following in conjunction with a preferred exemplified embodiment which is illustrated in the drawing.

DETAILED DESCRIPTION OF THE PREFERRED EMBODIMENTS

Figure 1:
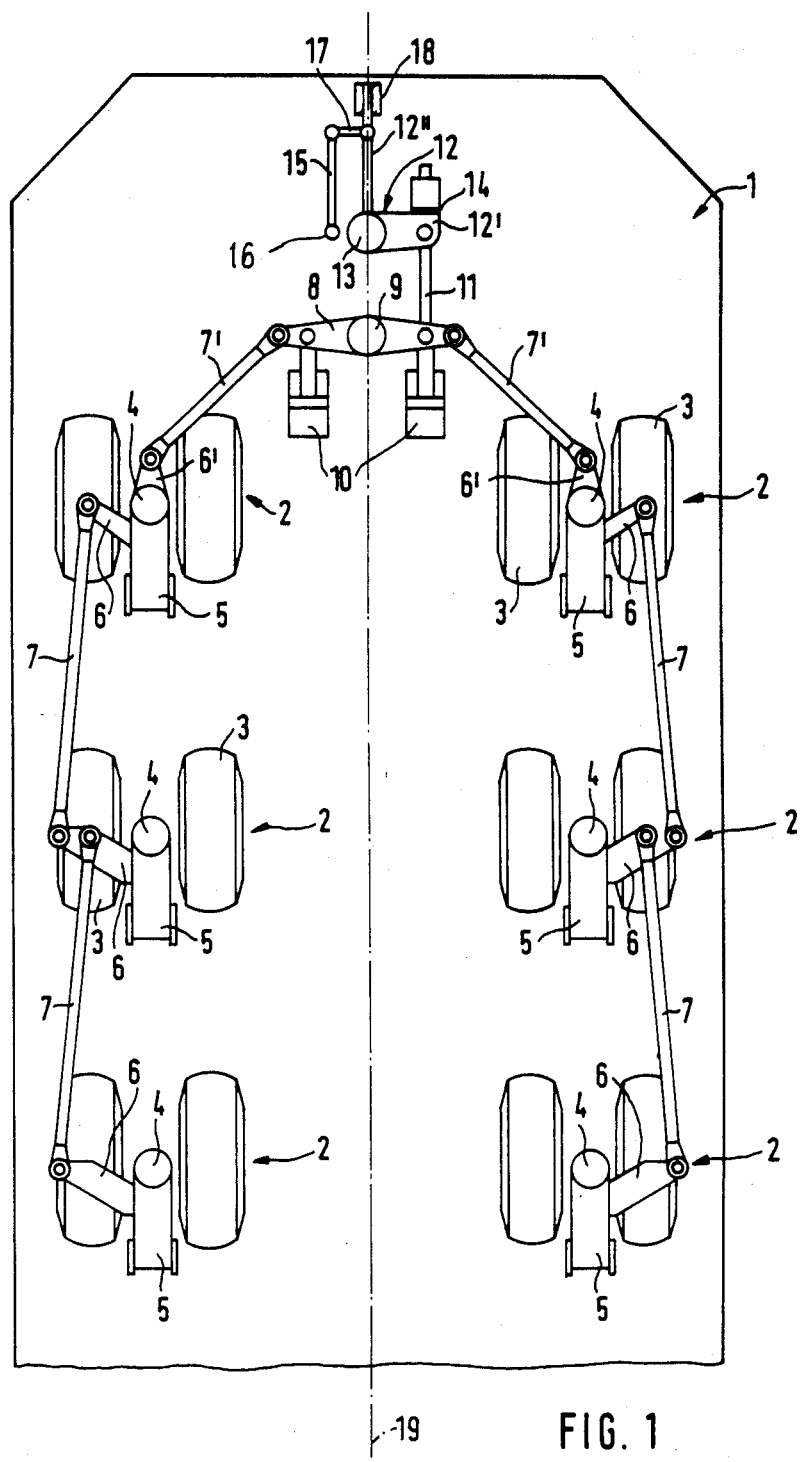
FIG. 1 is a schematic plan view of a vehicle which follows a straight guide track in a straight line of travel, whereby the guide track extends in the center of the vehicle due to a corresponding adjustment of the zero position of the scanning or sensor device.

The drawings illustrate schematically a vehicle front part 1 with six steerable axes 2. These axis support two steering wheels 3.

Steering levers 6 are provided on the axis supports 5 which are pivotable about the vehicle vertical axis of pivot 4, which levers in turn are connected with each other by track rods 7, so that the steering axis 2 of each side of the vehicle perform uniform steering movements. Moreover, the axes supports 5 of the two front steering axis are connected by means of further steering levers 6' and further track rods 7' with a steering traverse 8, which in turn is pivotably mounted about a vehicle vertical axis of pivot 9 and which is drivable by means of hydraulic steering cylinder units 10.

When the steering traverse 8 performs a pivoting motion in a clockwise direction, the steering axes 2 are also adjusted in the same pivot direction. The same is true during a pivoting motion of the steering traverse 8 in the counterclockwise direction.

In furtherance, the steering traverse 8 is coupled by a spindle 11 with an angular like shaped lever 12, which in turn is pivotally mounted about a vertical axis of pivot 13 on vehicle 1.

The spindle 11 which is pivoted in the proximity of the one end on the steering traverse 8 cooperates with an adjustment motor 14 which is pivotably mounted about a vertical axis of a pivot on the lever arm 12' of a toggle lever 12 and which drives a nut part or the like being displaceably mounted by turning on the spindle 11. Thereby, the distance of the free end of the lever arm 12' can be adjusted by the end of the steering traverse 8 which is connected with the spindle 11.

Adjacent to the other lever arm 12' of the toggle lever 12, a rod part 15 is mounted on the vehicle pivotably about a vertical axis of pivot 16. A support part 17 for a scanning or sensor device 18 is pivotably mounted on the free ends of the rod part 15 as well as of lever arm 12". This support part 17 is guided parallelogram like by the lever arm 12" as well as the rod part 15 when pivoting the toggle lever 12.

The scanning or sensor device 18 cooperates contactless with a guide track, for example, a guide wire which is embedded in the roadway in such a manner that the steering cylinder units 10 are adjusted by the scanning or sensor device 18 by means of a control, not shown, in such a manner that the scanning or sensor device 18 can migrate only slightly in a transverse direction with respect to the track guide 19. The steering cylinder units 10 serve as an adjustment drive for the scanning or sensor unit 18, so as to keep the same always above the guide track 19, as well as for a a drive of the vehicle steering. Thereby, the steering angles of the steering axes 2 are now clearly depending from the scanning or sensor device 18.

The advantage of the illustrated device resides, above all, in the fact that the scanning or sensor device 18 during the travel of the vehicle 1 can follow the guide track 19 in a snake like path, if need be, without the vehicle 1 performing pronounced pendulum movements in a lateral direction.

If the vehicle should be steered by a driver outside of paths with guide tracks 19, it suffices for a transfer to a driverless operation in the proximity of a guide track 19 that the driver turns the steering to such an extent that the scanning or sensor device 18 can coact with the guide track, i.e., "sees" the guide track 19. It is not required that the vehicle 1 assumes a predetermined relative position with respect to the guide track 19 or that it must be switched into such a relative position.

Figure 2:
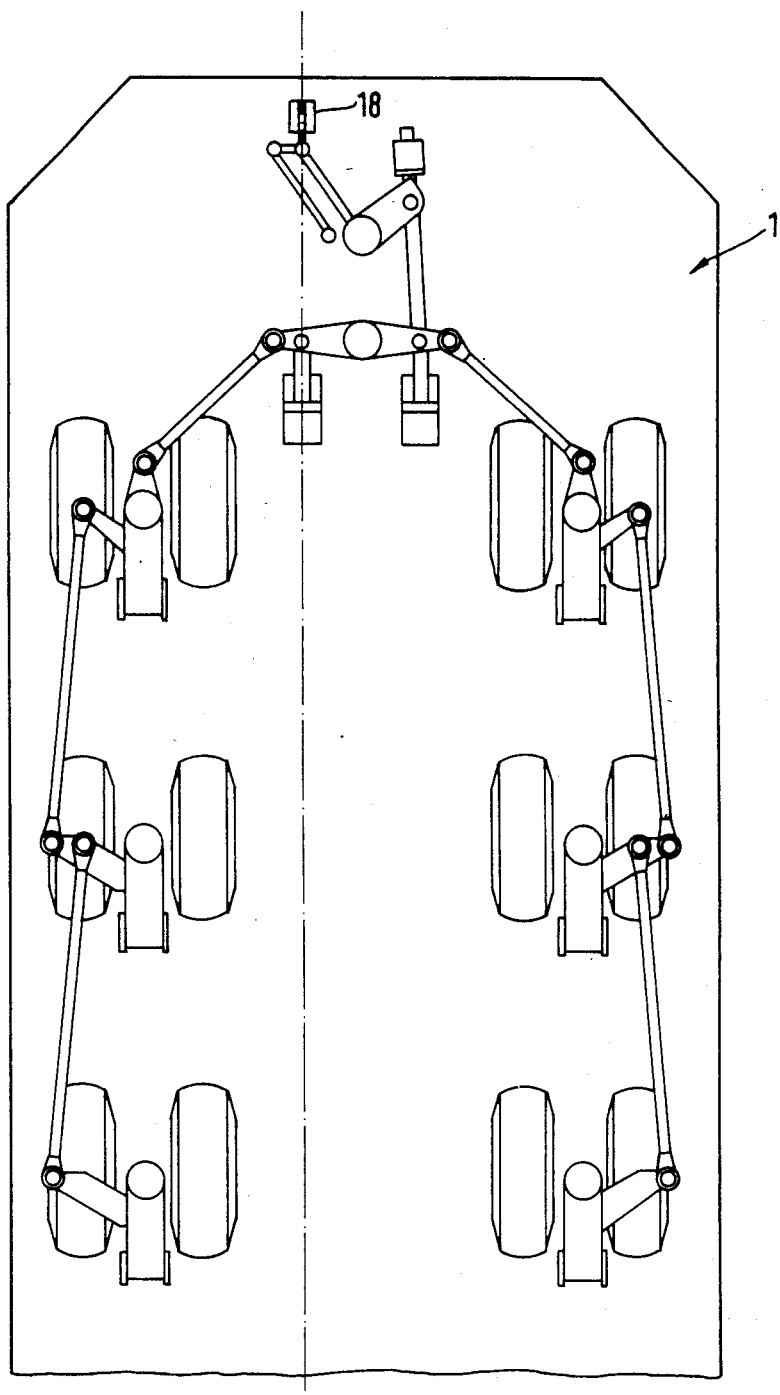
FIG. 2 is a plan view corresponding to FIG. 1, however with a left sided adjusted scanning or scanning device.
Figure 3:
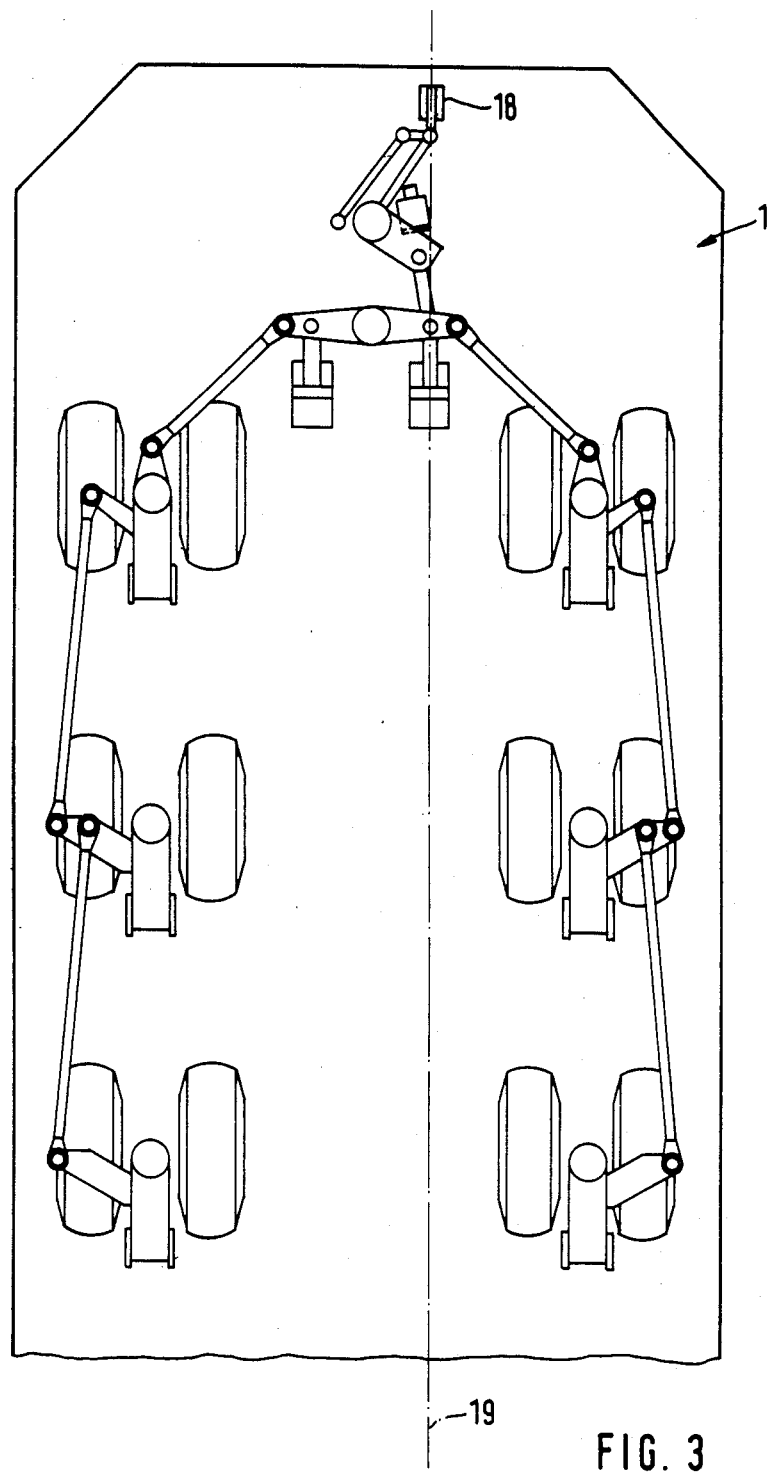
FIG. 3 is a plan view in accordance with FIG. 1, however with a right sided adjusted scanning or sensor device.

In FIGS. 1 to 3 the distance between the lever arm 12" of the toggle lever 12 and the end of the steering traverse 8 which is connected with spindle 11 are differently adjusted by a corresponding control of the adjustment motor 14. In the example of FIG. 1, the scanning or sensor device 18 assumes a position in the center of the steering axis 2 during a straight positioning of the steering axis 2, while the scanning or sensor device 18 in the example of FIGS. 2 and 3 are displaced either to the left or right relative with respect to the vehicle center in the straight position of the steering axis 2 (when seen in the driving direction). Thereby, it is achieved that the center of the vehicle is displaced either to the left or the right with respect to the guide track 19 when the scanning or sensor device 18 follows the guide track 19 during the travel of vehicle 1.

If need be it is possible to control the adjustment motor 14 during the travel of the vehicle, so that the drive track of the vehicle 1 is shifted with respect to the one side or the other side with respect to the guide track 19 during the travel. Accordingly, the drive track may be disposed in an offset manner in successive segments of the guide track 19. Thereby, the advantageous possibility is created that the vehicle 1 can pass by obstacles which have a relatively small distance from the guide track 19. Thus a shifting of the guide track 19 is no longer required.

In the illustrated exemplified embodiment the steering cylinder units 10 which serve as the adjustment drive for the scanning and sensor device 18 are mechanically coupled with the vehicle steering. Instead, an hydraulic or electric coupling is also possible.

For example, the adjustment drive for the scanning and sensor device 18 may be coupled with a poteentiometer (not shown) which generates adjustment signals for electric adjustment motors, which in turn adjust steering angles of the steeing axis 2 depending from the adjustment signals and thereby from the adjustment path of the scanning and sensor device 18.

In the illustrated example the scanning or sensor device 18 is mounted on the front end of the vehicle 1 in the driving direction. However, this is not necessarily required. Instead, the scanning and sensor device 18 may also be mounted further back of the hospital.

In addition it is also possible to provide scanning or sensor devices 18 at the front and rear end of the vehicle, whereby the scanning or sensor device 18 for controlling the steering during forward travel may be used, while the other scanning or sensor device takes over the other control during the rearward travel.

If need be, the scanning or sensor devices 18 may also serve for a heightwise adjustment of the vehicle 1, if the same is equipped with a level regulator. In this case the scanning or sensor devices 18 generate additional signals in dependency from their ground distances, so as to control support units of the axis 2 in a vertical direction. If need be, the scanning and sensor devices may also support on the ground, for example, by means of a wheel, whereby vertical relative movements of the scanning or sensor devices 18 are converted into the corresponding adjustment signals for the support units with respect to vehicle 1.

We claim:

1. A steering guiding device for a driverless drive operation of a steerable vehicle, comprising a scanning device (18) mounted on the vehicle in combination with a guide track disposed on the roadway and which influences the vehicle steering in such a manner that the distance between the scanning device and the guide track is kept at a minimum in a transverse direction of the vehicle; first adjusting drive means (10) operatively connected to said scanning device for adjusting said scanning device in a direction of travel of the vehicle and maintaining said scanning device about said guide track during the travel of the vehicle, said first adjusting drive means being also operatively connected to a steering of the vehicle whereby an adjustable path of said first adjusting drive means is a measure for a steering lock to be adjusted; and second adjusting drive means (14) operatively interconnected between said steering and said scanning device and being controllable and operative to adjust said scanning device in a direction transverse to the direction of travel of the vehicle so that a zero position of said scanning device which is associated with a straight forward movement of the vehicle is adjustable in said transverse direction, said second adjusting drive means being a controllable adjustment motor adjusting said zero position.

2. The steering guiding device as defined in claim 1, wherein said first adjusting drive means is immediately connected to said steering so as to immediately drive said steering.

3. The steering guiding device as defined in claim 2, wherein said steering has a steering linkage (7) having linkage rods (7'), said first drive means being coupled to said linkage rods.

4. The steering guiding device as defined in claim 2, wherein said steering has fluid units, said first adjusting drive means being coupled to said fluid units.

5. The steering guiding device as defined in claim 1, wherein said adjustment motor is remote controllable.

6. The steering guiding device as defined in claim 2, wherein said adjustment motor is pre-programmed controllable.

* * * * *